United States Patent [19]

Shibuya et al.

[11] Patent Number: 4,968,749

[45] Date of Patent: Nov. 6, 1990

[54] POLYPHENYLENE ETHER-POLYAMIDE RESIN COMPOSITION

[75] Inventors: Nobuhiro Shibuya; Kiyoji Takagi; Satoru Hattori; Tatsuo Kobayashi; Hironari Sano, all of Mie, Japan

[73] Assignee: Mitsubishi Petrochemical Company, Ltd., Tokyo, Japan

[21] Appl. No.: 330,992

[22] Filed: Mar. 29, 1989

Related U.S. Application Data

[62] Division of Ser. 110,266, Oct. 20, 1987 abandoned.

[30] Foreign Application Priority Data

Oct. 23, 1986 [JP] Japan ............................. 61-252551
Oct. 31, 1986 [JP] Japan ............................. 61-260438

[51] Int. Cl.$^5$ ............... C08L 51/04; C08L 71/12; C08L 77/00
[52] U.S. Cl. ............................. 525/92; 525/66; 525/68; 525/134; 525/181; 525/392; 525/395; 525/396; 525/397

[58] Field of Search ................ 525/397, 92, 905

[56] References Cited

U.S. PATENT DOCUMENTS

4,654,405  3/1987  Jalbert et al. .................. 525/397

FOREIGN PATENT DOCUMENTS

183195   6/1986   European Pat. Off. .
226910   7/1987   European Pat. Off. .
237948   9/1987   European Pat. Off. .
85/05372 12/1985  PCT Int'l Appl. .

*Primary Examiner*—Jacob Ziegler
*Attorney, Agent, or Firm*—Oblon, Spivak, McClelland, Maier & Neustadt

[57] ABSTRACT

A resin composition comprising (a) a polyphenylene ether resin, (b) a non-crystalline or low-crystalline polyamide resin, (c) a crystalline polyamide resin and, if desired, (d) a polar compound or a low-molecular diene polymer or the component (d) and (e) a rubbery polymer or an alkenyl aromatic compound/conjugated diene copolymer or a hydrogeneration product thereof. The composition is excellent in both impact strength, particularly on a plane part of a plate-molded article, and dimensional stability.

22 Claims, No Drawings

POLYPHENYLENE ETHER-POLYAMIDE RESIN COMPOSITION

This application is a Division of application Ser. No. 110,266, filed on Oct. 20. 1987, now abandoned.

FIELD OF THE INVENTION

This invention relates to a resin composition having an excellent balance between mechanical properties and other physical properties. More particularly, it relates to a resin composition suitable for injection molding, extrusion molding and blow molding which is excellent in planar impact strength when molded into a plate article as well as in organic solvent resistance and dimensional stability.

BACKGROUND OF THE INVENTION

Polyphenylene ether resins are attracting attention as being useful by their excellent mechanical properties and heat resistance and have been used in polymer blends with, for example, a styrene resin. However, since the polyphenylene ether resin is seriously inferior in solvent resistance, it has been proposed to eliminate this disadvantage by blending with polyamide as described in U.S. Pat. No. 4,338,421 or with polyester as described in Japanese Patent Publication No. 21662/76. Aiming at further improvements on impact strength of these polymer blends, it has also been proposed to incorporate, into the combination of polyphenylene ether and polyamide, a compound containing a carboxyl group, an imide group, an epoxy group, etc. as disclosed in U.S. Pat. No. 4,315,086, or to further incorporate a rubbery substance into such a resin composition as disclosed in Japanese Laid-Open Patent Application No. 49753/81.

On the other hand, plastic materials have recently been demanded to satisfy performance requirements of higher levels than ever before with a broadening of application of them. For example, the above-described polymer blends, though excellent in heat resistance and organic solvent resistance, have been demanded to have further enhanced mechanical strength. In order to meet the demand, the inventors previously developed a composition comprising a polyphenylene ether resin, a polyamide resin, and a compound containing an unsaturated group and a polar group per molecule, having incorporated therein an alkenyl aromatic compound/conjugated diene block copolymer having a copolymerization ratio within a specific range as disclosed in Japanese Laid-Open Patent Application No. 127339/87. When applied to the field of large-sized and plate-shaped industrial parts, however, this composition showed a tendency to be as yet not quite satisfactory in planar impact strength that is of importance in such application, leaving room for further improvements.

SUMMARY OF THE INVENTION

One object of this invention is to provide a polyphenylene ether-polyamide resin composition which attains a high level of mechanical properties, particularly high impact strength, on a plane of plate molded articles in a good balance with dimensional stability as demanded in the field of industrial parts and also exhibits satisfactory resistance to organic solvents as well.

The inventors have conducted extensive researches into various compounding ingredients and, as a result, it has now been found that the object of this invention can be accomplished by a resin composition comprising a polyphenylene ether resin and a polyamide resin, wherein the polyamide component comprises a combination of a non-crystalline or low-crystalline polyamide resin and a crystalline polyamide resin. The present invention has been completed based on this finding.

With respect to the aforesaid planar impact strength of plate-molded articles, the inventors pursued the relationship between impact strength and resistance against break due to impact (unbreakability) on the plane of plate-molded articles, paying special attention to, for example, Izod impact strength. As a result, there was not always noted a correlationship between Izod impact strength and unbreakability. It was rather dart drop impact strength that was proved to have a correlationship with unbreakability. According to this finding, the inventors made it a point to improve impact strength of the planar part, taking dart drop impact strength as a measure, and thus reached the present invention.

The present invention provides a resin composition essentially comprising (a) from 5 to 70% by weight of a polyphenylene ether resin, (b) from 1 to 94.5% by weight of a non-crystalline or low-crystalline polyamide resin, and (c) from 0.5 to 79% by weight of a crystalline polyamide resin and, if desired, (d) from 0.01 to 10 parts by weight of a polar compound or a low-molecular diene polymer or from 0.01 to 10 parts by weight of the component (d) and (e) from 1 to 40 parts by weight of a rubbery polymer or an alkenyl aromatic compound/conjugated diene copolymer or a hydrogenation product thereof each per 100 parts by weight of the total amount of the resin components (a), (b), and (c).

The resin composition according to the present invention exhibits dart drop impact strength of a higher level than ever before as well as satisfactory organic solvent resistance and satisfactory dimensional stability and is, therefore, suitable for use as industrial parts having a plate part.

DETAILED DESCRIPTION OF THE INVENTION

The polyphenylene ether resin (a) which can be used in the present invention has a repeating structural unit represented by formula:

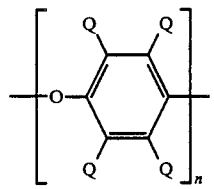

wherein plural Q's, which may be the same or different, each represents a monovalent substituent selected from a hydrogen atom, a halogen atom, a hydrocarbon group containing no tertiary α-carbon atom, a halogenated hydrocarbon group having at least two carbon atoms between a halogen atom and a phenyl nucleus, a hydrocarbon oxy group, and a halogenated hydrocarbon oxy group having at least two carbon atoms between a halogen atom and a phenyl nucleus; n represents an integer of at least 30; and the ether oxygen atom per unit is connected to the benzene nucleus of the adjacent unit.

The polyphenylene ether resins also include copolymers, such as a 2,6-dimethylphenol/2,3,6-trimethylphenol copolymer, a 2,6-dimethylphenol/2,3,5,6-tetramethylphenol copolymer, a 2,6-diethylphenol/2,3,6-trimethylphenol copolymer, etc. The polyphenylene ether resins further embrace modified resins obtained by, for example, grafting a styrene monomer (e.g., styrene, p-methylstyrene, α-methylstyrene, etc.) to the polyphenylene ether resin having the above-specified repeating unit.

The polyphenylene ether resin to be used preferably has such a molecular weight as having an intrinsic viscosity ranging from 0.3 to 0.7 dl/g, more preferably from 0.4 to 0.6 dl/g, and furthermore preferably from 0.45 to 0.55 dl/g, as determined in chloroform at 30° C. Intrinsic viscosities less than 0.3 dl/g result in insufficient impact strength of molded articles, and those more than 0.7 dl/g readily cause a difficulty in molding.

Processes for producing these polyphenylene ether resins are known and described, e.g., in U.S. Pat. Nos. 3,306,874, 3,306,875, 3,257,357, 3,257,358, 4,011,200, and 3,929,930.

Of the above-described polyphenylene ether resins, preferred in the present invention are those having the above-described repeating unit wherein the benzene nucleus have an alkyl group at each of the two ortho positions with respect to the ether oxygen atom, and 2,6-dialkylphenol/2,3,6-trialkylphenol copolymers.

The non-crystalline or low-crystalline polyamide resin (b) which can be used in the present invention has a

bond in its polymer chain and is recommended to have a glass transition temperature ranging from 70° C. to 250° C., preferably from 80° C. to 210° C., more preferably from 90° C. to 180° C., and most preferably from 100° C. to 150° C.

In general, the terminology "non-crystalline or low-crystalline resins" means resins having no clear melting point or measurable heat of fusion. While, in the present invention, this terminology is used to embrace resins exhibiting slight crystallizability when slowly cooled and resins exhibiting crystallizability within such a range that does not appreciably impair the effects of the present invention.

The glass transition temperature, melting point, and heat of fusion can be measured by means of a differential scanning calorimeter, such as Model "DSC-II" manufactured by Perkin-Elmer Co., Ltd., with which a heat of fusion can be measured at a rate of heating of, e.g., 10° C./min. More specifically, the measurement can be carried out by heating a sample to a temperature above an estimated melting point, cooling the sample to 30° C. at a cooling rate of 10° C./min, allowing the sample to stand at that temperature for about 1 minute, and then again heating the sample at a rate of 10° C./min. The heat of fusion measured at the time of heating is adopted as a measured value. The non-crystalline or low-crystalline polyamide to be used in the present invention can be defined to have a heat of fusion of up to 1 cal/g as measured by the above-described method. According to this measurement method, a heat of fusion of commercially available nylon-6 is about 16 cal/g.

The non-crystalline or low-crystalline polyamide resin (b) may have either an acyclic structure or a cyclic structure. Those having a cyclic structure are usually preforred because of their high glass transition points.

These polyamide resins may be polymers having a

bond which can be obtained from a monomer selected from (1) a combination of at least one of a hydrocarbon compound containing at least two, preferably two, of amino group per molecule and at least one of a hydrocarbon compound containing at least two, preferably two, of carboxyl group per molecule, with the former hydrocarbon compound being almost equimolar with the latter hydrocarbon compound, (2) a compound containing an amino group and a carboxyl group per molecule and (3) a so-called lactam compound having an amido group on its cyclic structure.

The polyamide (b) chiefly comprises amide bond-constituting structural units selected from structural formulae (I) to (VI) shown below so as to satisfy the aforesaid requirements of glass transition point and non- or low-crystallinity. The polyamide (b) to be used preferably comprises amide bond-constituting structural units selected from the structural formulae (I) to (VI), and those having a cyclic hydrocarbon structure are more preferred.

wherein W represents at least one of straight or branched chain aliphatic groups having from 2 to 12 carbon atoms.

wherein X represents an m-xylylene group or at least one of aliphatic groups having from 5 to 22 carbon atoms and containing at least one alicyclic hydrocarbon skeleton.

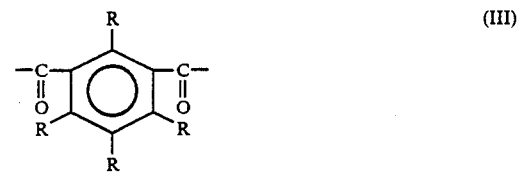

wherein plural R's, which may be the same or different, each represents a hydrogen atom or at least one of aliphatic groups having from 1 to 6 carbon atoms.

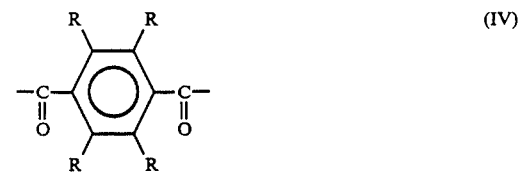

wherein plural R's are as defined above.

wherein Y represents at least one of aliphatic groups having from 2 to 22 carbon atoms, alicyclic groups having from 5 to 22 carbon atoms and aromatic groups consisting of two or more aromatic structures having from 10 to 22 carbon atoms such as a naphthylene group and a biphenyl group.

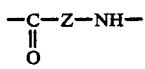
(VI)

wherein Z represents at least one of aliphatic or aromatic groups having from 4 to 14 carbon atoms.

In formula (I), W specifically represents a butylene group, a hexylene group, an octylene group, a decanylene group, a 2,2,4-trimethylhexylene group, a 2,4,4-trimethylhexylene group, a 3-methylhexylene group, a pentylene group, etc., and preferably a butylene group, a hexylene group, a 2,4,4-trimethylhexylene group, or a 2,2,4-trimethylhexylene group.

In formula (II), specific examples of X include: an m-xylylene group of formula (Xa),

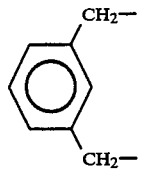

a 4,4'-methylenedicyclohexane-1,1'-diyl group of formula (Xb),

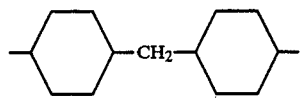

a 2,2'-dimethyl-4,4'-methylenedicyclohexane-1,1'-diyl group of formula (Xc),

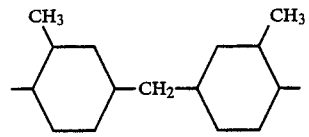

a 1,5,5-trimethylcyclohexylene-1-methylene group of formula (Xd),

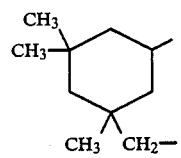

cyclohexylene-1,4-dimethylene group of formula (Xe),

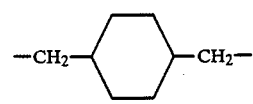

a 4-methylenecyclohexylene group of formula (Xf),

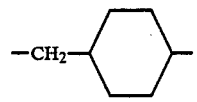

a 3-methylenecyclohexylene group of formula (Xg),

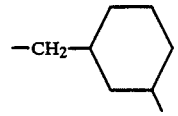

and a cyclohexylene-1,3-dimethylene group of formula (Xh),

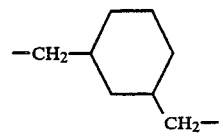

In formulae (III) and (IV), specific examples of R include a hydrogen atom, a methyl group, a t-butyl group, an isopropyl group, an ethyl group, etc., with a hydrogen atom and a methyl group being preferred. Of these, a hydrogen atom is the most preferred.

In formula (V), specific examples of Y include an ethylene group, a propylene group, a butylene group, a hexylene group, an octylene group, a decanylene group, a 1,4-cyclohexylene group, a 1,3-cyclohexylene group, the groups of formulae (Xa) to (Xh) as enumerated above with reference to formula (II), and the like. Preferred of these are an ethylene group, a propylene group, a butylene group, an octylene group, a 1,4-cyclohexylene group, and a 1,3-cyclohexylene group, with an ethylene group, a propylene group, and a butylene group being more preferred.

In formula (VI), specific examples of Z include a butylene group, a pentylene group, a hexylene group, a decanylene group, a undecanylene group, a p-phenylene group, etc. Preferred of these are a pentylene group, a hexylene group, and an undecanylene group, with a pentylene group being more preferred.

It is recommended that the non- or low-crystalline polyamide (b) has a relative viscosity of from 1 to 7 dl/g, preferably from 1.4 to 4 dl/g, and more preferably from 1.6 to 3 dl/g, as determined in 98% sulfuric acid at a concentration of 1 g/dl and at a temperature of 25° C.

The above-described non- or low-crystalline polyamide resins can be produced by known processes, for example, the processes disclosed in U.S. Pat. No. 295,018 and Japanese Laid-Open Patent Application Nos. 217237/85 and 219227/85.

The crystalline polyamide resin (c) which can be used in the present invention is a resin having a

bond in its main polymer chain, which is heat-fusible and has a clear melting point with a measurable heat of fusion. The melting point and heat of fusion can be measured by the use of a differential scanning calorimeter. Specific examples of the measuring equipment and method are the same as those illustrated for the non-crystalline or low-crystalline polyamide resin (b). The crystalline polyamide resin to be used as component (c) is defined to have a heat of fusion exceeding 1 cal/g as measured by this method.

Specific examples of the crystalline polyamide resin include nylon-4, nylon-6, nylon-12, nylon-6,6, nylon-4,6, nylon-6,10, nylon-6,12, nylon-6,T (i.e., polyamide prepared from hexamethylenediamine and terephthalic acid), nylon-MXD,b (i.e., polyamide prepared from m-xylylenediamine and adipic acid), a mixture of nylon-6 and nylon-6,6, a hexamethylenediamine/adipic acid/-caprolactam copolymer, and so on. Preferred among them are nylon-6,6 and nylon-6. These polyamide resins may be commercially available products, such as "UL-TRAMID" sold by BASF.

The polar compound which can be used as an optional component (d) in the resin composition of the present invention is a compound having at least one polar group in the molecule thereof. The polar group includes a carboxyl group, a functional group derived from a carboxyl group (e.g., an acid anhydride group, an ester group, an amido group, an imide group, an oxazoline group, a salt, a nitrile group, an acid azide group, a halogenated acyl group, etc.), an epoxy group, a hydroxyl group, an amino group, an imino group, an ether group, an isocyanic ester group, an aldehyde group, etc. In addition, compounds having an aromatic hydrocarbon group, an alicyclic hydrocarbon group or an aliphatic unsaturated group (e.g., a carbon-carbon double bond or triple bond, etc.) in addition to these polar groups may also be employed as polar compound (d).

Specific examples of these polar compounds include carboxylic acids or derivatives thereof, e.g., malic acid, trimellitic acid, trimellitic anhydride or its monohalide, pyromellitic acid, etc.; oxidized waxes obtained by oxidative treatment of natural waxes or synthetic low molecular weight polyolefins; compounds obtained by condensation between polyhydric phenols (e.g., bisphenol A, bisphenol F, tetrabromobisphenol A, phenol novolak, cresol novolak, etc.) or polyhydric alcohols (e.g., ethylene glycol, propylene glycol, butane-1,4-diol, polyethylene glycol, polypropylene glycol, glycerin, trimethylolpropane, pentaerythritol, etc.) and epichlorohydrin at various ratios; glycidylated or epoxidized compounds obtained from these polyhydric phenols or alcohols, monohydric phenols or alcohols, various amine compounds, or higher olefins; and epoxy-containing polymers having various molecular weights obtained by copolymerizing a vinyl monomer (e.g., ethylene, vinyl acetate, styrene, acrylic esters, methacrylic esters, acrylonitrile, etc.) and glycidyl methacrylate.

The aforesaid compounds having both a polar group and an unsaturated group in the molecule thereof include unsaturated carboxylic acids or derivatives thereof, unsaturated epoxy compounds, unsaturated alcohols, unsaturated amines, and unsaturated isocyanic esters. Specific examples are maleic anhydride, maleic acid, fumaric acid, maleimide, maleic hydrazide; reaction products formed between maleic anhydride and a diamine, e.g., compounds having formula:

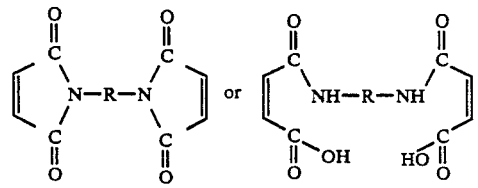

wherein R represents an aliphatic or aromatic group; methylnadic anhydride, dichloromaleic anhydride, maleinamide, itaconic acid, itaconic anhydride; nuraral fats and oils, e.g., soybean oil, tung oil, castor oil, linseed oil, hempseed oil, cotton seed oil, sesami oil, colza oil, peanut oil, tsubaki oil, olive oil, coconut oil, sardine oil, etc.; epoxidized natural fats and oils, e.g., epoxidized soybean oil; unsaturated carboxylic acids, e.g., acrylic acid, butenoic acid, crotonic acid, vinylacetic acid, methacrylic acid, pentenoic acid, angelic acid, tiglic acid, 2-pentenoic acid, 3-pentenoic acid, α-ethylacrylic acid, β-methylcrotonic acid, 4-pentenoic acid, 2-hexenoic acid, 2-methyl-2-pentenoic acid, 3-methyl-2-pentenoic acid, α-ethylcrotonic acid, 2,2-dimethyl-3-butenoic acid, 2-heptenoic acid, 2-octenoic acid, 4-decenoic acid, 9-undecenoic acid, 10-undecenoic acid, 4-dodecenoic acid, 5-dodecenoic acid, 4-tetradecenoic acid, 9-tetradecenoic acid, 9-hexadecenoic acid, 2-octadecenoic acid, 9-octadecenoic acid, eicosenoic acid, docosenoic acid, erucic acid, tetracosenoic acid mycolipenic acid, 2,4-pentadienoic acid, 2,4-hexadienoic acid, diallylacetic acid, geranic acid, 2,4-decadienoic acid, 2,4-dodecadienoic acid, 9,12-hexadecadienoic acid, 9,12-octadecadienoic acid, hexadecatrienoic acid, linoleic acid, linolenic acid, octadecatrienoic acid, eicosadienoic acid, eicosatrienoic acid, eicosatetraenoic acid, ricinoleic acid, eleostearic acid, oleic acid, eicosapentaenoic acid, docosadienoic acid, docosatrienoic acid, docosatetraenoic acid, docosapentaenoic acid, tetracosenoic acid, hexacosenoic acid, hexacodienoic acid, octacosenoic acid, triacontenoic acid, etc.; esters, acid amides or anhydrides of these unsaturated carboxylic acids; unsaturated alcohols, e.g., allyl alcohol, crotyl alcohol, methylvinylcarbinol, allylcarbinol, methylpropenylcarbinol, 4-penten-1-ol, 10-undecen-1-ol, propargyl alcohol, 1,4-pentadien-3-ol, 1,4-hexadien-3-ol, 3,5-hexadien-2-ol, 2,4-hexadien-1-ol, alcohols of formula $C_nH_{2n-5}OH$, $C_nH_{2n-7}OH$, or $C_nH_{2n-9}OH$, wherein n is a positive integer, 3-butene-1,2-diol, 2,5-dimethyl-3-hexene-2,5-diol, 1,5-hexadiene-3,4-diol, 2,6-octadiene-4,5-diol, etc.; unsaturated amines derived from these unsaturated alcohols by displacing the OH group with a —NH₂ group; low polymers (having an average molecular weight, e.g., of from about 500 to 10,000) or high polymers (having an average molecular weight, e.g., above 10,000) of butadiene, isoprene, etc. to which maleic anhydride or a phenol has been added or an amino, carboxyl, hydroxyl, epoxy, or the like group has been introduced; allyl isocyanate; and the like.

The compounds having both an unsaturated group and a polar group in the molecule thereof which can be used in the present invention may contain two or more unsaturated groups, either the same or different, and/or two or more polar compounds, either the same or different. These unsaturated polar compounds may be used either individually or in combinations of two or more thereof. Among the above-recited compounds, preferred are unsaturated dicarboxylic acids and anhydrides thereof, e.g., maleic anhydride, maleic acid, itaconic anhydride, itaconic acid, etc.; unsaturated alcohols, e.g., oleyl alcohol, etc.; and epoxidized natural fats and oils, e.g., epoxidized soybean oil. More preferred are maleic anhydride, maleic acid, oleyl alcohol, epoxidized soybean oil, and epoxidized linseed oil, with maleic anhydride being the most preferred.

The low-molecular diene polymer which can also be used as optional component (d) in the resin composition of the invention includes a homopolymer of a conjugated diene, a copolymer of at least two conjugated dienes and copolymers of a conjugated diene and at least one comonomer selected from non-conjugated dienes, olefins, aromatic vinyl compounds, and acetylene-containing compounds, and has an average molecular weight falling within a range of from 150 to 5,000.

Specific examples of the conjugated diene include butadiene, isoprene, 1,3-pentadiene, cyclopentadiene, 2,3-dimethylbutadiene, chloroprene, 2-phenylbutadiene, etc. Proportions of chemical bond structures, e.g., a 1,2-bond, a 1,4-bond, a cis-1,4-bond, a trans-1,4-bond, etc., in the low-molecular diene polymer are not particularly limited.

Of the above-described polar compounds and low-molecular conjugated diene polymers as the component (d), preferred are low-molecular conjugated diene polymers and the compounds having both a polar group and an unsaturated group per molecule. More preferred are the compounds having both a polar group and an unsaturated group per molecule.

The rubbery polymer which can be used as optional component (e) in the resin composition of the present invention is a natural or synthetic polymer exhibiting rubbery elasticity at room temperature. The rubbery polymer to be used preferably has a modulus of elasticity of up to $5 \times 10^8$ dyn/cm$^2$.

Specific examples of the rubbery polymer include natural rubber, polybutadiene, polyisoprene, polychlorobutadiene, polyisobutylene, isobutylene/conjugated diene copolymers, butadiene/acrylonitrile copolymers, acrylic ester polymers, ethylene/propylene copolymers, ethylene/butene-1 copolymers, ethylene/propylene/non-conjugated diene copolymers, silicone rubbers, Thiokol rubbers, polysulfide rubbers, polyurethane rubbers, polyether rubbers (e.g., polypropylene oxide, etc.), chlorinated polyethylene, epichlorohydrin rubbers, etc.

The alkenyl aromatic compound/conjugated diene copolymer or the hydrogenation product thereof which can also be used as optional component (e) in the resin composition of the present invention includes copolymers comprising an alkenyl aromatic compound and a conjugated diene as main monomer components in the form of a random, graft, or block copolymer and the like, which may partially contain a crosslinked structure, in which at least a part of the aliphatic unsaturated bonds derived from the conjugated diene may be hydrogenated. The alkenyl aromatic compound/conjugated diene copolymer or the hydrogenation product thereof to be used may have either a modulus of elasticity of up to $5 \times 10^8$ dyn/cm$^2$ or a modulus of elasticity of more than $5 \times 10^8$ dyn/cm$^2$.

These rubbery polymers and alkenyl aromatic compound/conjugated diene copolymers or hydrogenation products thereof to be used are not limited in degree of crosslinking, molecular structure (e.g., a cis structure, a trans structure, a 1,2-bond, a 1,4-bond, the order of a head-to-tail bond, a block form, randomness, graft form, stereoregularity, etc.), and average rubber particle size. The rubbery polymers and alkenyl aromatic compound/conjugated diene copolymers or hydrogenation products thereof further include those obtained by copolymerization with polar group-containing unsaturated compounds, such as other olefins, dienes, aromatic vinyl compounds (e.g., chlorostyrene), acrylic acid, acrylic esters, acrylonitrile, maleic anhydride or its derivatives, itaconic acid or its derivatives, glycidyl methacrylate, hydroxyethyl (meth)acrylate, etc., in the form of a graft, block, or random copolymer, and the like. Polymers modified through hydroxylation, carboxylation, amination, epoxidation, hydrogenation, halogenation, and the like may also be employed.

Of these rubbery polymers and alkenyl aromatic compound/conjugated diene copolymers or hydrogenation products thereof, the alkenyl aromatic compound/conjugated diene copolymers and the hydrogenated products thereof are preferred from the standpoint of ensuring impact strength of the resulting resin composition.

Of these alkyl aromatic compound/conjugated diene copolymers and hydrogenation products thereof, non-hydrogenated copolymers are preferred. Further, random copolymers and block copolymers are preferred, with block copolymers being more preferred. Of the block copolymers, particularly preferred are linear block copolymers.

The linear block copolymers are represented by formula:

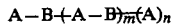

wherein m represents 0 or a positive integer; n represents 0 or 1; A represents a polymer block derived from an aromatic alkenyl compound; and B represents an elastomeric polymer block derived from a conjugated diene.

The block A usually has a weight average molecular weight of from 500 to 125,000, and preferably from 5,000 to 110,000. The block B usually has a weight average molecular weight of from 1,500 to 250,000, and preferably from 15,000 to 220,000. The linear block copolymers may also contain blocks A and B having smaller molecular weights.

The alkenyl aromatic compound/conjugated diene copolymer preferably has a Brookfield viscosity (in a 25 wt % toluene solution at 25° C.), indicative of a molecular weight, of from 200 to 40,000 cps, more preferably from 600 to 30,000, and most preferably from 800 to 25,000.

The alkenyl aromatic compound includes styrene, α-methylstyrene, vinyltoluene, other lower alkyl-substituted styrenes, vinylnaphthalene, etc., with styrene being particularly preferred.

The conjugated diene includes butadiene, isoprene, and a mixture of butadiene and isoprene, with butadiene being particularly preferred. In addition, the conjugated diene component may contain cyclopentadiene and its derivatives, 2,3-dimethylbutadiene, and other lower alkyl-substituted butadienes. Further, the conjugated diene component may contain an olefinic hydrocarbon (e.g., ethylene, propylene, 1-butene, etc.) or a non-conjugated diene as far as they do not greatly impair elastomer properties of the block A.

A recommended content of the alkenyl aromatic compound unit in the alkenyl aromatic compound/conjugated diene copolymer or its hydrogenated product ranges from 15 to 75% by weight, preferably from 25 to 65% by weight, more preferably from 28 to 60% by weight, and most preferably from 28 to 50% by weight.

The alkenyl aromatic compound/conjugated diene block copolymer can be produced by various processes. Typical processes include, for example, the processes described in Japanese Patent Publication No. 23798/65 and U.S. Pat. Nos. 3,595,942 and 4,090,996, in which block copolymerization is carried out in an inert solvent in the presence of a lithium catalyst or a Ziegler catalyst. Some of these block copolymers are commercially available under trade names, e.g., "KRATON-D" or "KARIFLEX" sold by Shell Chemical, and "TR" sold by Japan Synthetic Rubber Co., Ltd.

Hydrogenation of the unsaturated bonds derived from the conjugated diene can be carried out, for example, in an inert solvent in the presence of a hydrogenating catalyst according to the process described in Japanese Patent Publication No. 8704/67, 6636/68, and 20814/71.

Hydrogenation may also be effected in an inert solvent using p-toluenesulfonyl hydrazide, etc. in accordance with the process disclosed in *Journal of Polymer Science Part B Polymer Letters*, Vol. 11, pp 427–434 (1973).

Some of the thus hydrogenated block copolymers are commercially available under trade names, such as "KRATON-G" sold by Shell Chemical.

These alkenyl aromatic compound/conjugated diene copolymers or hydrogenated products thereof may be used either individually or in combinations thereof.

The resin composition according to the present invention essentially comprises from 5 to 70% by weight, preferably from 20 to 65% by weight, more preferably from 30 to 60% by weight, and most preferably from 35 to 57% by weight, of the component (a); from 1 to 94.5% by weight, preferably from 3 to 80% by weight, and more preferably from 6 to 60% by weight, of the component (b), and from 0.5 to 79% by weight, preferably from 2 to 79% by weight, and more preferably from 5 to 79% by weight, of the component (c), each based on the total amount of the components (a), (b), and (c).

The resin composition of the present invention may further comprise, if desired, from 0.01 to 10 parts by weight, preferably from 0.05 to 5 parts by weight, more preferably from 0.1 to 2 parts by weight, and most preferably from 0.2 to 1 part by weight, of the component (d) and from 1 to 40 parts by weight, preferably from 5 to 35 parts by weight, more preferably from 8 to 25 parts by weight, and most preferably from 8 to 20 parts by weight, of the component (e), each per 100 parts by weight of the total amount of the components (a), (b), and (c).

If the content of the component (a) is less than 5% by weight, the resulting composition tends to have unsatisfactory resistance to thermal stiffness and water absorption characteristics. If it exceeds 70% by weight, organic solvent resistance of the composition becomes poor.

A content of the component (b) of less than 1% by weight is unfavorable for achieving the object of obtaining a resin composition having a very high level of dart drop impact strength, and that exceeding 94.5% by weight is unfavorable from the standpoint of resistance to thermal stiffness.

Taking improvement on dart drop impact strength into consideration, a recommended content of the component (b) ranges from 1 to 55% by weight, and preferably from 2 to 39% by weight. Taking not only impact strength of plate-shaped articles but also dimensional stability into consideration, it preferably ranges from 30 to 94.5% by weight, more preferably from 35 to 80% by weight, and most preferably from 35 to 70% by weight.

Not only impact strength of plate-shaped articles but dimensional stability of a satisfactory level being taken into consideration, the content of the component (c) is preferably from 0.5 up to 50% by weight, more preferably from 0.5 up to 29% by weight, and most preferably from 2 up to 15% by weight. Further, the content of the component (c) is preferably at least 30% by weight for improving resistance to organic solvent, and up to 94% by weight for maintaining heat resistance. Furthermore, the content of the component (b) is recommended to be up to 70% by weight, and preferably up to 60% by weight, based on the total amount of the components (b), and (c).

When the content of the component (d) is less than 0.01 part by weight, the resulting resin composition is likely to have an unsatusfactory level of impact strength. When it exceeds 10 parts by weight, there is a tendency to deterioration in mechanical properties and appearance of molded articles.

When the content of the component (e) is less than 1 part by weight, the resulting resin composition tends to have a reduced level of impact strength, while if it exceeds 40 parts by weight, the level of stiffness tends to be reduced.

The resin composition in accordance with the present invention may further comprise thermoplastic or thermosetting resins or rubbery components other than the above-described components and various compounding additives, such as antioxidants, weathering agents, nucleating agents, slip agents, organic or inorganic fillers or reinforcements, flame retarders, various colorants, antistatics, parting agents, and the like, as far as the resins and compounding additives do not impair the objects of the present invention.

The antioxidants to be added include stabilizers, such as highly hindered phenols, thioethers, phosphorus compounds, amine compounds, and the like.

The resin composition of this invention can be obtained by the use of a commonly employed kneading machine, e.g., a single screw extruder, a twin screw extruder, a Banbury mixer, a roll mill, Brabender Plastograph, a kneader, etc. It is usually prepared by kneading the components by means of an extruder, etc. to obtain a compound in the form of pellets for molding. In special cases, all the components may be directly supplied to various types of a molding machine and molded while being kneaded therein. It is also possible that fillers and other components and, if desired, various additives are kneaded in high concentrations to obtain a master batch, and the master batch is then diluted with other polymers, etc. to obtain a blended compound or be molded while being diluted with other polymers, etc.

The component (d) selected from polar compounds and low-molecular diene polymers and the component (e) may be previously mixed together or subjected to partial grafting by, for example, melt-kneading in the presence or absence of a peroxide or heating in an organic solvent or the like technique. This is preferred particularly where the component (e) is a hydrogenated alkenyl aromatic compound/conjugated diene copolymer. The filler may be previously kneaded with the crystalline polyamide resin.

Molding methods applied to the composition of the present invention are not particularly restricted, and the composition can easily be molded by any of commonly employed molding methods for thermoplastic resins, such as extrusion molding, blow molding, injection molding, sheet forming, thermoforming, rotational molding, laminate molding, etc. Injection molding is the most suitable.

The resin composition according to the present invention exhibit satisfactory mechanical properties and dimensional stability and is, therefore, suitable for use as various industrial parts, such as automobile interior and exterior parts, exterior parts of appliances, and parts of so-called office automation equipments.

The present invention will now be illustrated in greater detail with reference to the following Examples and Comparative Examples, but it should be understood that these examples are not deemed to limit the present invention. In the examples, all the parts and percents are by weight unless otherwise indicated.

In the examples, physical properties of resin compositions were determined and evaluated as follows.

(1) Dimentional Stability:

A coefficient of linear expansion was determined in accordance with ASTM-D696 at a measuring temperature of from 23° C. to 80° C.

(2) Flexural Modulus of Elasticity

Measured in accordance with ISO R178-1974 procedure 12 (JIS K7203) by the use of an Instron tester.

(3) Dart Drop Impact Strength:

A specimen [120 mm×80 mm×2 mm (t)] was placed on a support having a hole of 40 mm in diameter. A load-sensing dart (2 m×7 Kgf) was fallen on the specimen, and the deformation and destruction behavior of the specimen to the impact under load was measured. From the resulting impact pattern was calculated an impact energy having been absorbed up to the point where a crack initiated to obtain an impact strength. The measurement was conducted at a temperature of 23° C. and −30° C.

(4) Organic Solvent Resistance

An injection-molded specimen [129 mm×12.5 mm×4 mm (t)] was immersed in commercially available gasolin at room temperature for 7 days, and any change in appearance was observed and evaluated as follows.

| Excellent | No substantial change was observed. |
| Intermediate | Surface roughening or whitening was observed. |
| Bad | Serious surface roughening or whitening was observed. |

(5) Izod Impact Strength

Measured in accordance with ISO R180-1969 (JIS K7110) (notched Izod impact strength) by the use of an Izod impact tester manufactured by Toyo Seiki Seisaku-sho. The measurement was conducted at a temperature of 23° C., −30° C. and −40° C.

EXAMPLES 1 TO 9 AND COMPARATIVE EXAMPLES 1 TO 8

Prescribed amounts of the components shown below were thoroughly stirred and kneaded in a super mixer. At this time, a stabilizer ("IRGANOX 1010", produced by Ciba Geigy) was added to the mixture in an amount of 0.3 part per 100 parts of the total polymer components. The blend was then melt-kneaded in a twin screw extruder ("PCM" manufactured by Ikegai Iron Works, Ltd.) at a set temperature of 280° C. and extruded into strands, followed by cutting into pellets.

Specimens for evaluation were prepared by injection molding of the pellets by the use of an in-line screw injection machine ("IS-90B" manufactured by Toshiba Machine Co., Ltd.) at a cylinder temperature of 280° C. and at a mold cooling temperature of 60° C. Prior to injection molding, the pellets were dried in a vacuum dryer under reduced pressure of 0.1 mmHg at 80° C. for 48 hours until they were injection-molded.

The injection-molded specimens immediately after molding were allowed to stand in a desiccator at 23° C. for 4 to 6 days before measurement of various physical properties.

The components used in Examples and Comparative Examples as referred to in Tables 1 to 4 were as follows:

(a) Polyphenylene Ether Resin

Poly(2,6-dimethyl-1,4-phenylene)ether having an intrinsic viscosity of 0.52 dl/g (30° C., in chloroform) (abbreviated as PDME)

(b) Non- or Low-Crystalline Polyamide

"NOVAMID X21" [a trade name produced by Mitsubishi Chemical Ind., Ltd.; glass transition point: 125° C.; relative viscosity (JIS K6810): 2.1 dl/g]

(c) Crystalline Polyamide

Nylon-6,6 ("ULTRAMID-A3" produced by BASF) or nylon-6 ("ULTRAMIDE-B5" produced by BASF)

(d) Polar Compound or Low-Molecular Diene Polymer

Commercially available maleic anhydride of reagent grade (e) Rubbery Polymer or Alkenyl Aromatic Compound/Conjugated Diene Copolymer or Hydrogenation Product Thereof "TR 2000" (a trade name of styrene/butadiene block copolymer produced by Japan Synthetic Rubber Co., Ltd.; styrene content: 40%)

(f) Filler (Comparative Component)

Talc having an average particle size of 2 μm

Each of the resin compositions was evaluated for performance properties by the methods described above, and the results obtained are shown in Tables 1 to 4 below.

TABLE 1

|  | Example 1 | Comparative Example 1 | Comparative Example 2 | Comparative Example 3 |
| --- | --- | --- | --- | --- |
| Composition: | | | | |
| PDME (%) | 50 | 50 | 50 | 50 |
| NOVAMID X21 (%) | 40 | 50 | — | — |
| Nylon-6,6 (%) | 10 | — | 50 | 50 |
| Maleic Anhydride (part)* | 0.5 | 0.5 | 0.5 | 0.5 |
| TR 2000 (part)* | 14 | 14 | 14 | 14 |
| Talc (part)* | — | — | — | 23 |
| Physical Properties: | | | | |
| Linear Expansion Coefficient | 8.1 | 7.9 | 11.6 | 8.1 |

TABLE 1-continued

| | Example 1 | Comparative Example 1 | Comparative Example 2 | Comparative Example 3 |
|---|---|---|---|---|
| (23° C.–80° C.) ($\times 10^{-5}$/°C.) | | | | |
| Flexural Modulus of Elasticity at 23° C. (Kg/cm$^2$) | 20800 | 22500 | 19900 | 27800 |
| Dart Drop Impact Strength (Kg · cm) | | | | |
| at 23° C. | 176 | 133 | 116 | 13 |
| at −30° C. | 103 | 65 | 80 | 7 |
| Organic Solvent Resistance | excellent | excellent | excellent | excellent |
| Izod Impact Strength (Kg · cm/cm) | | | | |
| at 23° C. | 20.9 | 18.4 | 18.9 | 2.9 |
| at −40° C. | 8.0 | 7.8 | 10.0 | 1.6 |

Note:
*Per 100 parts of the total amount of the components (a), (b), and (c).

TABLE 2

| | Example 2 | Example 3 | Example 4 | Example 5 | Example 6 | Example 7 | Comparative Example 4 |
|---|---|---|---|---|---|---|---|
| Composition: | | | | | | | |
| PDME (%) | 50 | 50 | 50 | 50 | 50 | 50 | 50 |
| NOVAMID X21 (%) | 4 | 10 | 20 | 28 | 10 | 25 | — |
| Nylon-6,6 (%) | 46 | 40 | 30 | 22 | — | — | — |
| Nylon-6 (%) | — | — | — | — | 40 | 25 | 50 |
| Maleic Anhydride (part)* | 0.4 | 0.4 | 0.4 | 0.3 | 0.5 | 0.5 | 0.5 |
| TR 2000 (part)* | 14 | 14 | 14 | 10 | 12 | 12 | 12 |
| Physical Properties: | | | | | | | |
| Flexural Modulus of Elasticity at 23° C. | 20000 | 20100 | 20300 | 21700 | 20800 | 20900 | 20600 |
| Dart Drop Impact Strength (Kg · cm) | | | | | | | |
| at 23° C. | 198 | 215 | 252 | 209 | 215 | 220 | 71 |
| at −30° C. | 158 | 182 | 248 | 197 | 112 | 243 | 40 |
| Organic Solvent Resistance | excellent | excellent | excellent | excellent | excellent | excellent | excellent |
| Izod Impact Strength (Kg · cm/cm) | | | | | | | |
| at 23° C. | 19.2 | 20.4 | 23.7 | 21.3 | 53.8 | 53.6 | 34.6 |
| at −40° C. | 8.2 | 8.4 | 10.6 | 8.5 | 11.8 | 14.2 | 11.2 |

Note:
*The same as in Table 1.

TABLE 3

| | Example 8 | Comparative Example 5 | Comparative Example 6 |
|---|---|---|---|
| Composition: | | | |
| PDME (%) | 50 | 50 | 50 |
| NOVAMID X21 (%) | 10 | 50 | — |
| Nylon-6 (%) | 40 | — | 50 |
| Maleic Anhudride (part)* | — | — | — |
| TR 2000 (part)* | — | — | — |
| Physical Properties: | | | |
| Flexural Modulus of Elasticity at 23° C. (Kg/cm$^2$) | 24500 | 27200 | 26000 |
| Dart Drop Impact Strength (Kg · cm) | | | |
| at 23° C. | 16 | 12 | 10 |
| at −30° C. | 17 | 8.6 | 12 |
| Organic Solvent Resistance | excellent | excellent | excellent |
| Izod Impact Strength (Kg · cm/cm) | | | |
| at 23° C. | 2.7 | 2.7 | 2.4 |
| at −30° C. | 2.6 | 2.8 | 2.6 |

Note:
*The same as in Table 1.

TABLE 4

| | Example 9 | Comparative Example 7 | Comparative Example 8 |
|---|---|---|---|
| Composition: | | | |
| PDME (%) | 50 | 50 | 50 |
| NOVAMID X21 (%) | 10 | 50 | — |
| Nylon-6 (%) | 40 | — | 50 |
| Maleic Anhydride (part)* | 0.5 | 0.5 | 0.5 |
| TR 2000 (part)* | — | — | — |
| Physical Properties: | | | |
| Flexural Modulus of Elasticity at 23° C. (Kg/cm$^2$) | 24900 | 27000 | 25900 |
| Dart Drop Impact Strength at −30° C. (Kg · cm) | 60 | 53 | 47 |
| Organic Solvent Resistance | excellent | excellent | excellent |
| Izod Impact Strength (Kg · cm/cm) | | | |
| at 23° C. | 4.5 | 6.9 | 2.7 |
| at −30° C. | 3.8 | 3.9 | 3.2 |

Note:
*The same as in Table 1.

Making comparisons between Examples 1 to 5 and Comparative Examples 1 and 2, between Examples 6 and 7 and Comparative Examples 1 and 4, between Example 8 and Comparative Examples 5 and 6, and between Example 9 and Comparative Examples 7 and 8, it can be seen that the polyphenylene ether-polyamide compositions according to the present invention in which the polyamide component comprises a combination of non-crystalline or low-crystalline polyamide and crystalline polyamide exhibit a higher level of dart drop impact strength than the comparative compositions using either one of the non- or low-crystalline polyamide and crystalline polyamide, thus clearly demonstrating the effects of the present invention.

It is revealed from a comparison between Example 1 and Comparative Examples 1 to 3 that the comparative composition using crystalline polyamide in combination with an inorganic filler generally known as an additive for improving dimensional stability (Comparative Example 3), the comparative composition using only the non-crystalline polyamide as a polyamide component (Comparative Example 1), and the composition using a combination of the non- or low-crystalline polyamide and the crystalline polyamide (Example 1) have the same level of coefficient of linear expansion, a measure for dimensional stability, that is smaller than that of the comparative composition using only the crystalline polyamide (Comparative Example 2). While, of these three compositions, the composition of Example 1 shows not only a markedly higher level of dart drop impact strength than the other two, demonstrating the effects of the present invention, but also an excellent balance between dimensional stability and dart drop impact strength.

Incidentally, there is noted no correlationship between dart drop impact strength and Izod impact strength of the resin compositions.

While the invention has been described in detail and with reference to specific embodiments thereof, it will be apparent to one skilled in the art that various changes and modifications can be made therein without departing from the spirit and scope thereof.

What is claimed is:

1. A resin composition comprising (a) from 5 to 70% by weight of a polyphenylene ether resin, (b) from 1 to 94.5% by weight of a non-crystalline or low-crystalline polyamide resin having a heat of fusion of up to 1 cal/g, with the heat of fusion being measured by means of a differential scanning calorimeter, (c) from 0.5 to 79% by weight of a crystalline polyamide resin having a heat of fusion exceeding 1 cal/g, (d) from 0.01 to 10 parts by weight of a polar compound having at least one polar group, and (e) from 1 to 40 parts by weight of a block copolymer of an alkenyl aromatic compound/conjugated diene copolymer or a hydrogenation product thereof per 100 parts by weight of the total amount of the components (a), (b), and (c).

2. A resin composition as claimed in claim 1, wherein said non-crystalline or low-crystalline polyamide resin has a relative viscosity of from 1 to 7 dl/g as determined in 98% sulfuric acid at a concentration of 1 g/dl and at a temperature of 25° C.

3. A resin composition as claimed in claim 1, wherein said non-crystalline or low-crystalline polyamide resin has a relative viscosity of from 1.4 to 4 dl/g as determined in 98% sulfuric acid at a concentration of 1 g/dl and at a temperature of 25° C.

4. A resin composition as claimed in claim 1, wherein said non-crystalline or low-crystalline polyamide resin has a relative viscosity of from 1.6 to 3 dl/g as determined in 98% sulfuric acid at a concentration of 1 g/dl and at a temperature of 25° C.

5. A resin composition as claimed in claim 1, wherein said non-crystalline or low-crystalline polyamide resin is a cyclic polyamide resin.

6. A resin composition as claimed in claim 1, wherein said non-crystalline or low-crystalline polyamide resin has a glass transition point of from 70° to 250° C.

7. A resin composition as claimed in claim 1, wherein said polyphenylene ether resin has an intrinsic viscosity of from 0.3 to 0.7 dl/g as determined in chloroform at 30° C.

8. A resin composition as claimed in claim 1, wherein said polyphenylene ether resin has an intrinsic viscosity of from 0.4 to 0.6 dl/g as determined in chloroform at 30° C.

9. A resin composition as claimed in claim 1, wherein said polyphenylene ether resin has an intrinsic viscosity of from 0.45 to 0.55 dl/g as determined in chloroform at 30° C.

10. A resin composition as claimed in claim 1, wherein the component (b) is present in an amount of from 30 to 94.5% by weight based on the total amount of the components (a), (b), and (c).

11. A resin composition as claimed in claim 1, wherein the component (b) is present in an amount of from 35 to 80% by weight based on the total amount of the components (a), (b), and (c).

12. A resin composition as claimed in claim 1, wherein the component (b) is present in an amount of from 35 to 70% by weight based on the total amount of the components (a), (b), and (c).

13. A resin composition as claimed in claim 1, wherein the component (c) is present in an amount of from 0.5 up to 50% by weight based on the total amount of the components (a), (b), and (c).

14. A resin composition as claimed in claim 1, wherein the component (c) is present in an amount of from 0.5 up to 29% by weight based on the total amount of the components (a), (b), and (c).

15. A resin composition as claimed in claim 1, wherein the component (b) is present in an amount of up to 70% by weight based on the total amount of the components (b) and (c).

16. A resin composition as claimed in claim 1, wherein the component (b) is present in an amount of up to 60% by weight based on the total amount of the components (b) and (c).

17. A resin composition as claimed in claim 1, wherein the component (b) is present in an amount of from 2 to 39% by weight based on the total amount of the components (a), (b), and (c).

18. A resin composition as claimed in claim 1, wherein the component (d) is selected from a compound having an unsaturated bond and a polar group in the molecule thereof and a low-molecular diene polymer.

19. A resin composition as claimed in claim 1, wherein the component (d) is a compound having an unsaturated bond and a polar group in the molecule thereof.

20. A resin composition as claimed in claim 1, wherein said compound having an unsaturated bond and a polar group in the molecule thereof is maleic anhydride, maleic acid, oleyl alcohol, epoxidized soybean oil, or epoxidized linseed oil.

21. A resin composition as claimed in claim 1, wherein said compound having an unsaturated bond and polar group in the molecule thereof is maleic anhydride.

22. A resin composition as claimed in claim 1, wherein said block copolymer is a linear block copolymer.

* * * * *